United States Patent
Kondo et al.

(10) Patent No.: US 12,461,058 B2
(45) Date of Patent: Nov. 4, 2025

(54) GAS SENSOR AND CONCENTRATION MEASUREMENT METHOD USING GAS SENSOR

(71) Applicant: NGK INSULATORS, LTD., Nagoya (JP)

(72) Inventors: Yuichiro Kondo, Obu (JP); Taku Okamoto, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 342 days.

(21) Appl. No.: 18/187,108

(22) Filed: Mar. 21, 2023

(65) Prior Publication Data
US 2023/0314367 A1    Oct. 5, 2023

(30) Foreign Application Priority Data

Mar. 31, 2022   (JP) ................................ 2022-058402

(51) Int. Cl.
    *G01N 27/41*   (2006.01)
    *G01M 15/10*   (2006.01)
    *G01N 27/27*   (2006.01)

(52) U.S. Cl.
    CPC .......... *G01N 27/41* (2013.01); *G01M 15/102* (2013.01); *G01N 27/27* (2013.01)

(58) Field of Classification Search
    CPC ...... G01N 27/41; G01N 27/27; G01N 27/419; G01N 27/407; G01M 15/102
    See application file for complete search history.

(56) References Cited

U.S. PATENT DOCUMENTS

| 6,254,749 B1 * | 7/2001 | Yokota ............... G01N 27/4074 |
| | | 204/426 |
| 2004/0112765 A1 * | 6/2004 | Alkemade ............ G01N 27/419 |
| | | 204/426 |

(Continued)

FOREIGN PATENT DOCUMENTS

| JP | 5918177 B2 | 5/2016 |
| JP | 6469464 B2 | 2/2019 |

(Continued)

OTHER PUBLICATIONS

Maskell et al., Detection of water vapour or carbon dioxide using a zirconia pump-gauge sensor, Sensors and Actuators B, 1999, 57, 99-107 (Year: 1999).*

*Primary Examiner* — Luan V Van
*Assistant Examiner* — Shizhi Qian
(74) *Attorney, Agent, or Firm* — MATTINGLY & MALUR, PC (57) ABSTRACT

A sensor element includes first to third chambers communicating sequentially from a gas inlet, voltages are intermittently applied across inner electrodes facing the respective chambers and a reference pump electrode to perform pumping of oxygen between a measurement gas and the reference pump electrode being in contact with a reference gas, thereby to reduce $H_2O$ and $CO_2$ in the measurement gas into $H_2$ and CO in the first chamber, to oxidize $H_2$ into $H_2O$ in the second chamber, to oxidize CO into $CO_2$ in the third chamber, and to identify a concentration of $H_2O$ and a concentration of $CO_2$ based on a pumping-in current at the time when electromotive force between an inner electrode and the reference pump electrode during non-application of a voltage is maintained at a target value.

4 Claims, 3 Drawing Sheets

(56) References Cited

U.S. PATENT DOCUMENTS

| | | | |
|---|---|---|---|
| 2008/0105545 A1* | 5/2008 | Nakagaki | G01N 27/419 |
| | | | 204/424 |
| 2015/0034484 A1 | 2/2015 | Nakasone et al. | |
| 2016/0216229 A1* | 7/2016 | Okamoto | G01N 27/419 |
| 2016/0223487 A1* | 8/2016 | Okamoto | G01N 27/407 |
| 2020/0041438 A1* | 2/2020 | Watanabe | G01N 27/4071 |

FOREIGN PATENT DOCUMENTS

| | | | |
|---|---|---|---|
| JP | 2019086338 A | * | 6/2019 |
| JP | 2020067432 A | * | 4/2020 |

* cited by examiner

GAS SENSOR AND CONCENTRATION MEASUREMENT METHOD USING GAS SENSOR

CROSS-REFERENCE TO RELATED APPLICATION

The present application claims priority from Japanese application JP2022-058402, filed on Mar. 31, 2022, the contents of which is hereby incorporated by reference into this application.

BACKGROUND OF THE INVENTION

Field of the Invention

The present invention relates to a multi-gas sensor capable of sensing a plurality of types of sensing target gas components and measuring concentrations thereof.

Description of the Background Art

In measurement for managing the amount of an emitted exhaust gas from a vehicle, technology of measuring a concentration of carbon dioxide ($CO_2$) has already been known (see Japanese Patent No. 5918177 and Japanese Patent No. 6469464, for example). In each of gas sensors disclosed in Japanese Patent No. 5918177 and Japanese Patent No. 6469464, in addition to a carbon dioxide ($CO_2$) component, a water vapor ($H_2O$) component can be measured in parallel.

As for a gas sensor having a structure as disclosed in Japanese Patent No. 5918177 and Japanese Patent No. 6469464, there is a general need for simplification of the structure while accuracy is maintained. A simpler structure leads to fewer manufacturing steps, a more reliable sensor, and lower cost.

For example, in a case of a sensor element of each of the gas sensors disclosed in Japanese Patent No. 5918177 and Japanese Patent No. 6469464, electrodes containing precious metals are arranged at five locations, and reduction in number of electrodes is desirable in terms of simplification of the structure and, further, reduction in cost.

SUMMARY

The present invention is directed to a multi-gas sensor capable of sensing a plurality of types of sensing target gas components and measuring concentrations thereof, and, in particular, relates to a gas sensor capable of measuring concentrations of a plurality of sensing target gas components in a measurement gas at least containing water vapor and carbon dioxide.

According to the present invention, a gas sensor capable of measuring concentrations of a plurality of sensing target gas components in a measurement gas at least containing water vapor and carbon dioxide includes: a sensor element including a structure formed of an oxygen-ion conductive solid electrolyte; and a controller controlling operation of the gas sensor, wherein the sensor element includes: a gas inlet through which the measurement gas is introduced; a first chamber, a second chamber, and a third chamber communicating sequentially from the gas inlet via different diffusion control parts; a reference pump electrode being in contact with a reference gas; a first pump cell including a first inner electrode disposed to face the first chamber, the reference pump electrode, and a portion of the solid electrolyte present between the first inner electrode and the reference pump electrode; a second pump cell including a second inner electrode disposed to face the second chamber, the reference pump electrode, and a portion of the solid electrolyte present between the second inner electrode and the reference pump electrode; and a third pump cell including a third inner electrode disposed to face the third chamber, the reference pump electrode, and a portion of the solid electrolyte present between the third inner electrode and the reference pump electrode, the first pump cell pumps out oxygen from the first chamber so that substantially all of water vapor and carbon dioxide contained in the measurement gas introduced through the gas inlet into the first chamber are decomposed, the second pump cell pumps in oxygen to the second chamber to selectively oxidize, in the second chamber, hydrogen contained in the measurement gas, which has been generated by decomposition of water vapor and is introduced from the first chamber into the second chamber, the third pump cell pumps in oxygen to the third chamber to oxidize, in the third chamber, carbon monoxide contained in the measurement gas, which has been generated by decomposition of carbon dioxide and is introduced from the second chamber into the third chamber, the controller includes: a first pump cell control element controlling a voltage applied across the first inner electrode and the reference pump electrode of the first pump cell and a time of application therefor; a second pump cell control element controlling a voltage applied across the second inner electrode and the reference pump electrode of the second pump cell and a time of application therefor; a third pump cell control element controlling a voltage applied across the third inner electrode and the reference pump electrode of the third pump cell and a time of application therefor; a water vapor concentration identification element identifying a concentration of water vapor contained in the measurement gas based on a magnitude of a current flowing between the second inner electrode and the reference pump electrode at the time when the second pump cell pumps in oxygen to the second chamber; and a carbon dioxide concentration identification element identifying a concentration of carbon dioxide contained in the measurement gas based on a magnitude of a current flowing between the third inner electrode and the reference pump electrode at the time when the third pump cell pumps in oxygen to the third chamber, the first pump cell control element causes the first pump cell to operate intermittently at intervals of 10 ms or less so that non-application electromotive force V1 is maintained at a predetermined target value in a range of 1000 mV to 1500 mV, the non-application electromotive force V1 being generated between the first inner electrode and the reference pump electrode when the voltage is not applied across the first inner electrode and the reference pump electrode, the second pump cell control element causes the second pump cell to operate intermittently at intervals of 10 ms or less so that non-application electromotive force V2 is maintained at a predetermined target value in a range of 250 mV to 450 mV, the non-application electromotive force V2 being generated between the second inner electrode and the reference pump electrode when the voltage is not applied across the second inner electrode and the reference pump electrode, and the third pump cell control element causes the third pump cell to operate intermittently at intervals of 10 ms or less so that non-application electromotive force V3 is maintained at a predetermined target value in a range of 100 mV to 300 mV, the non-application electromotive force V3 being generated between the third inner electrode and the reference pump electrode when the voltage is not applied across the third inner electrode and the reference pump electrode.

According to the present invention, a multi-gas sensor capable of measuring concentrations of predetermined gas components in the measurement gas as with a conventional gas sensor while having a smaller number of and a smaller area of electrodes, having a simpler structure, and being manufactured at a lower cost than the conventional gas sensor is implemented.

It is thus an object of the present invention to provide a gas sensor having a simpler structure.

These and other objects, features, aspects and advantages of the present invention will become more apparent from the following detailed description of the present invention when taken in conjunction with the accompanying drawings.

DESCRIPTION OF THE PREFERRED EMBODIMENTS

<Configuration of Gas Sensor>

Figure 1:
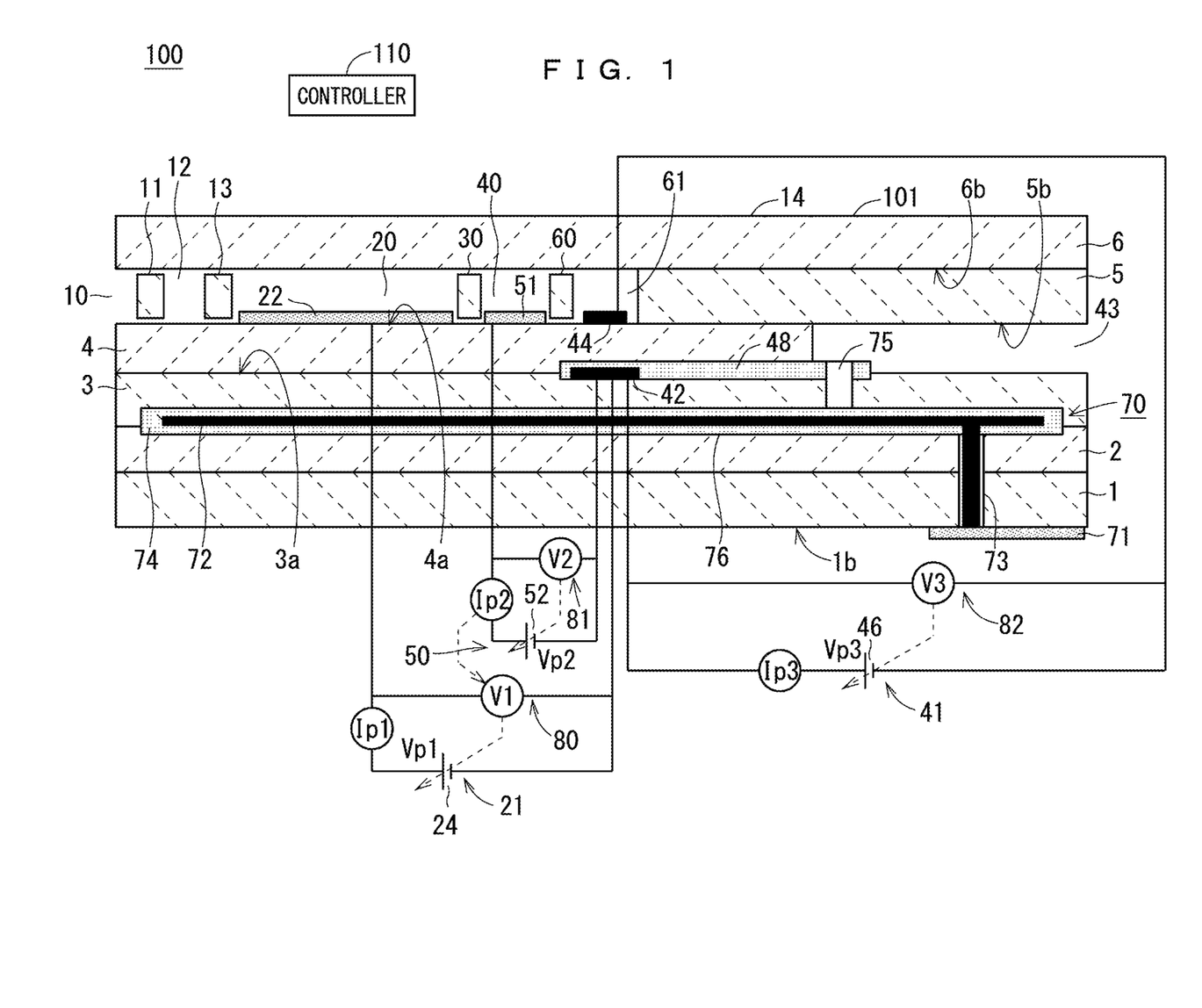
FIG. 1 schematically shows one example of a configuration of a gas sensor 100.

FIG. 1 schematically shows one example of a configuration of a gas sensor 100 according to the present embodiment. The gas sensor 100 is a multi-gas sensor sensing a plurality of types of gas components and measuring concentrations thereof using a sensor element 101. Assume that at least water vapor ($H_2O$) and carbon dioxide ($CO_2$) are main sensing target gas components of the gas sensor 100 in the present embodiment. The gas sensor 100 is attached to an exhaust path of an internal combustion engine, such as an engine of a vehicle, and is used with an exhaust gas flowing along the exhaust path as a measurement gas, for example. FIG. 1 includes a vertical cross-sectional view taken along a longitudinal direction of the sensor element 101.

The sensor element 101 includes an elongated planar structure (base part) 14 formed of an oxygen-ion conductive solid electrolyte, a gas inlet 10 which is located in one end portion (a left end portion in FIG. 1) of the structure 14 and through which the measurement gas is introduced, and a buffer space 12, a first chamber 20, a second chamber 40, and a third chamber 61 located in the structure 14 and communicating sequentially from the gas inlet 10. The buffer space 12 communicates with the gas inlet 10 via a first diffusion control part 11. The first chamber 20 communicates with the buffer space 12 via a second diffusion control part 13. The second chamber 40 communicates with the first chamber 20 via a third diffusion control part 30. The third chamber 61 communicates with the second chamber 40 via a fourth diffusion control part 60.

The structure 14 is formed by laminating a plurality of substrates of ceramics, for example. Specifically, the structure 14 has a configuration in which six layers including a first substrate 1, a second substrate 2, a third substrate 3, a first solid electrolyte layer 4, a spacer layer 5, and a second solid electrolyte layer 6 are sequentially laminated from the bottom. Each layer is formed of an oxygen-ion conductive solid electrolyte, such as zirconia ($ZrO_2$).

The gas inlet 10, the first diffusion control part 11, the buffer space 12, the second diffusion control part 13, the first chamber 20, the third diffusion control part 30, the second chamber 40, the fourth diffusion control part 60, and the third chamber 61 are formed in this order between a lower surface 6b of the second solid electrolyte layer 6 and an upper surface 4a of the first solid electrolyte layer 4 on a side of the one end portion of the structure 14. A part extending from the gas inlet 10 to the third chamber 61 is also referred to as a gas distribution part.

The gas inlet 10, the buffer space 12, the first chamber 20, the second chamber 40, and the third chamber 61 are formed to penetrate the spacer layer 5 in a thickness direction. The lower surface 6b of the second solid electrolyte layer 6 is exposed in upper portions in FIG. 1 of these chambers and the like, and the upper surface 4a of the first solid electrolyte layer 4 is exposed in lower portions in FIG. 1 of these chambers and the like. Side portions of these chambers and the like are each defined by the spacer layer 5 or any of the diffusion control parts.

The first diffusion control part 11, the second diffusion control part 13, the third diffusion control part 30, and the fourth diffusion control part 60 each include two horizontally long slits. That is to say, they each have openings elongated in a direction perpendicular to the page of FIG. 1 in an upper portion and a lower portion in FIG. 1 thereof.

The sensor element 101 includes a reference gas introduction space 43 in the other end portion (a right end portion in FIG. 1) opposite the one end portion in which the gas inlet 10 is located. The reference gas introduction space 43 is formed between an upper surface 3a of the third substrate 3 and a lower surface 5b of the spacer layer 5. A side portion of the reference gas introduction space 43 is defined by a side surface of the first solid electrolyte layer 4. Oxygen ($O_2$) of air is introduced into the reference gas introduction space 43 as reference gases, for example.

The gas inlet 10 is a part opening to an external space, and the measurement gas is taken from the external space into the sensor element 101 through the gas inlet 10.

The first diffusion control part 11 is a part providing predetermined diffusion resistance to the measurement gas introduced through the gas inlet 10 into the buffer space 12.

The buffer space 12 is formed to cancel concentration fluctuations of the measurement gas caused by pressure fluctuations of the measurement gas in the external space. Pulsation of exhaust pressure of the exhaust gas of the vehicle is taken as an example of such pressure fluctuations of the measurement gas, for example.

The second diffusion control part 13 is a part providing predetermined diffusion resistance to the measurement gas introduced from the buffer space 12 into the first chamber 20.

The first chamber 20 is formed as a space to pump out oxygen from the measurement gas introduced through the second diffusion control part 13, and, further, to reduce (decompose) $H_2O$ and $CO_2$ contained as the sensing target gas components in the measurement gas to generate hydrogen ($H_2$) and carbon monoxide (CO) so that not only oxygen but also $H_2O$ and $CO_2$ are not substantially contained in the measurement gas. Reduction (decomposition) of $H_2O$ and $CO_2$ is implemented by operation of a first pump cell 21.

The first pump cell 21 is an electrochemical pump cell including a first inner pump electrode 22, a reference pump electrode 42, and a solid electrolyte present in a portion of the structure 14 sandwiched between these electrodes.

In the first pump cell 21, a voltage Vp1 is applied across the first inner pump electrode 22 and the reference pump electrode 42 from a variable power supply 24 disposed outside the sensor element 101 to generate an oxygen pump current (oxygen ion current) Ip1. Oxygen in the first chamber 20 can thereby be pumped out to the reference gas introduction space 43.

The first inner pump electrode 22 is disposed on only substantially the entire portion of the upper surface 4a of the first solid electrolyte layer 4 defining the first chamber 20.

The first inner pump electrode 22 is formed, with platinum as a metal component, as a porous cermet electrode including platinum and zirconia and being rectangular in plan view, for example.

The reference pump electrode 42 is an electrode formed between the first solid electrolyte layer 4 and the third substrate 3, and is formed as a porous cermet electrode including platinum and zirconia and being rectangular in plan view, for example.

A reference gas introduction layer 48 formed of porous alumina and leading to the reference gas introduction space 43 is disposed around the reference pump electrode 42. A reference gas in the reference gas introduction space 43 is introduced into a surface of the reference pump electrode 42 via the reference gas introduction layer 48. That is to say, the reference pump electrode 42 is always in contact with the reference gas.

On the other hand, the first inner pump electrode 22, the reference pump electrode 42, and the solid electrolyte present in the portion of the structure 14 sandwiched between these electrodes also constitute a first chamber sensor cell 80. The first chamber sensor cell 80 is an electrochemical sensor cell to grasp oxygen partial pressure in an atmosphere in the first chamber 20.

In the first chamber sensor cell 80, electromotive force (Nernst electromotive force) V1 is generated between the first inner pump electrode 22 and the reference pump electrode 42. As will be described below, use of the first pump cell 21 is intermittent, and the electromotive force V1 (also referred to as non-application electromotive force V1) at a timing when the first pump cell 21 is not used and thus the voltage Vp1 is not applied from the variable power supply 24 has a value in accordance with a difference between an oxygen concentration (oxygen partial pressure) in the first chamber 20 and an oxygen concentration (oxygen partial pressure) of the reference gas. The oxygen concentration (oxygen partial pressure) of the reference gas is basically constant, so that the non-application electromotive force V1 has a value in accordance with the oxygen concentration (oxygen partial pressure) in the first chamber 20 at the timing.

The third diffusion control part 30 is a part providing predetermined diffusion resistance to the measurement gas introduced from the first chamber 20 into the second chamber 40, containing $H_2$ and CO, and substantially not containing $H_2O$, $CO_2$, and oxygen.

The second chamber 40 is formed as a space to selectively oxidize, from among $H_2$ and CO contained in the measurement gas introduced through the third diffusion control part 30, only all of $H_2$ to generate $H_2O$ again. Generation of $H_2O$ due to oxidation of $H_2$ is implemented by operation of a second pump cell 50.

The second pump cell 50 is an electrochemical pump cell including a second inner pump electrode 51, the reference pump electrode 42, and a solid electrolyte present in a portion of the structure 14 sandwiched between these electrodes.

In the second pump cell 50, a voltage Vp2 is applied across the second inner pump electrode 51 and the reference pump electrode 42 from a variable power supply 52 disposed outside the sensor element 101 to generate an oxygen pump current (oxygen ion current) Ip2. Oxygen can thereby be pumped in from the reference gas introduction space 43 to the second chamber 40.

The second inner pump electrode 51 is disposed on only substantially the entire portion of the upper surface 4a of the first solid electrolyte layer 4 defining the second chamber 40.

The second inner pump electrode 51 is formed, with a Pt—Au alloy as a metal component, as a porous cermet electrode including the Pt—Au alloy and zirconia and being rectangular in plan view, for example.

On the other hand, the second inner pump electrode 51, the reference pump electrode 42, and the solid electrolyte present in the portion of the structure 14 sandwiched between these electrodes also constitute a second chamber sensor cell 81. The second chamber sensor cell 81 is an electrochemical sensor cell to grasp oxygen partial pressure in an atmosphere in the second chamber 40.

In the second chamber sensor cell 81, electromotive force (Nernst electromotive force) V2 is generated between the second inner pump electrode 51 and the reference pump electrode 42. As will be described below, use of the second pump cell 50 is intermittent, and the electromotive force V2 (also referred to as non-application electromotive force V2) at a timing when the second pump cell 50 is not used and thus the voltage Vp2 is not applied from the variable power supply 52 has a value in accordance with a difference between an oxygen concentration (oxygen partial pressure) in the second chamber 40 and the oxygen concentration (oxygen partial pressure) of the reference gas. Since the oxygen concentration (oxygen partial pressure) of the reference gas is basically constant, the non-application electromotive force V2 has a value in accordance with the oxygen concentration (oxygen partial pressure) in the second chamber 40 at the timing.

The fourth diffusion control part 60 is a part providing predetermined diffusion resistance to the measurement gas introduced from the second chamber 40 into the third chamber 61, containing $H_2O$ and CO, and substantially not containing $CO_2$ and oxygen.

The third chamber 61 is formed as a space to oxidize all of CO contained in the measurement gas introduced through the fourth diffusion control part 60 to generate $CO_2$ again. Generation of $CO_2$ due to oxidation of CO is implemented by operation of a third pump cell 41.

The third pump cell 41 is an electrochemical pump cell including a third inner pump electrode 44, the reference pump electrode 42, and a solid electrolyte present in a portion of the structure 14 sandwiched between these electrodes.

In the third pump cell 41, a voltage Vp3 is applied across the third inner pump electrode 44 and the reference pump electrode 42 from a variable power supply 46 disposed outside the sensor element 101 to generate an oxygen pump current (oxygen ion current) Ip3. Oxygen can thereby be pumped in from the reference gas introduction space 43 to the third chamber 61.

The third inner pump electrode 44 is disposed on substantially the entire portion of the upper surface 4a of the first solid electrolyte layer 4 defining the third chamber 61.

The third inner pump electrode 44 is formed, with platinum as a metal component, as a porous cermet electrode including platinum and zirconia and being rectangular in plan view, for example.

On the other hand, the third inner pump electrode 44, the reference pump electrode 42, and the solid electrolyte present in the portion of the structure 14 sandwiched between these electrodes also constitute a third chamber sensor cell 82. The third chamber sensor cell 82 is an electrochemical sensor cell to grasp oxygen partial pressure in an atmosphere in the third chamber 61.

In the third chamber sensor cell 82, electromotive force (Nernst electromotive force) V3 is generated between the third inner pump electrode 44 and the reference pump electrode 42. As will be described below, use of the third pump cell 41 is intermittent, and the electromotive force V3 (also referred to as non-application electromotive force V3) at a timing when the third pump cell 41 is not used and thus the voltage Vp3 is not applied from the variable power supply 46 has a value in accordance with a difference between an oxygen concentration (oxygen partial pressure) in the third chamber 61 and the oxygen concentration (oxygen partial pressure) of the reference gas. Since the oxygen concentration (oxygen partial pressure) of the reference gas is basically constant, the non-application electromotive force V3 has a value in accordance with the oxygen concentration (oxygen partial pressure) in the third chamber 61 at the timing.

In addition to the foregoing, the sensor element 101 includes a heater 72 sandwiched between the second substrate 2 and the third substrate 3 from above and below. The heater 72 generates heat by being powered from outside through a heater electrode 71 disposed on a lower surface 1b of the first substrate 1. The heater 72 is buried over the entire region of a range from the buffer space 12 to the third chamber 61, and can heat the sensor element 101 to a predetermined temperature and, further, maintain the temperature. The heater 72 generates heat to enhance oxygen ion conductivity of the solid electrolyte forming the sensor element 101.

A heater insulating layer 74 of alumina and the like is formed above and below the heater 72 to electrically insulate the heater 72 from the second substrate 2 and the third substrate 3. The heater 72, the heater electrode, and the heater insulating layer 74 are hereinafter also collectively referred to as a heater part. The heater part also includes a pressure dissipation hole 75. The pressure dissipation hole 75 is a part formed to penetrate the third substrate 3 and communicate with the reference gas introduction space 43, and is formed to mitigate a rise in internal pressure associated with a rise in temperature in the heater insulating layer 74.

The sensor element 101 having a configuration as described above differs from a sensor element of a conventional gas sensor as disclosed in Japanese Patent No. 5918177 and Japanese Patent No. 6469464, for example, particularly in layout of various electrodes.

Specifically, in the sensor element 101, the first inner pump electrode 22 in the first chamber 20 and the second inner pump electrode 51 in the second chamber 40 are arranged on only substantially the entire portions of the upper surface 4a of the first solid electrolyte layer 4, whereas, in a case of a conventional sensor element, electrodes corresponding to these electrodes are also arranged at least on portions of the lower surface 6b of the second solid electrolyte layer 6 defining the respective chambers.

In the sensor element 101, each of the first to the third inner pump electrodes, the reference pump electrode 42, and the solid electrolyte present between these electrodes constitute the pump cell, respectively. These pump cells perform pumping (-out or -in) of oxygen between the first to the third chambers and the reference gas introduction space 43, whereas, in a case of the conventional sensor element, an outer pump electrode is separately disposed on an outer surface of the element, each of electrodes corresponding to the first to the third inner pump electrodes, the outer pump electrode, and solid electrolyte present between these electrodes constitute pump cell, respectively, and the pump cells perform pumping of oxygen between the first to the third chambers and the external space. An electrode (a reference electrode) corresponding to the reference pump electrode 42 of the sensor element 101 is not used for pumping of oxygen, and is used simply as a reference for a potential in each of the sensor cells.

That is to say, in the sensor element 101 of the gas sensor 100 according to the present embodiment, the number and the area of pump electrodes are reduced, and functions of the reference electrode are combined compared with the sensor element of the conventional gas sensor. In light of precious metals, such as platinum, being used for the pump electrodes, it can be said that the gas sensor 100 according to the present embodiment is manufactured at a lower cost than the conventional gas sensor.

The gas sensor 100 further includes a controller 110 performing processing of identifying concentrations of the sensing target gas components based on currents flowing through the sensor element 101 while controlling operation of the sensor element 101.

Figure 2:
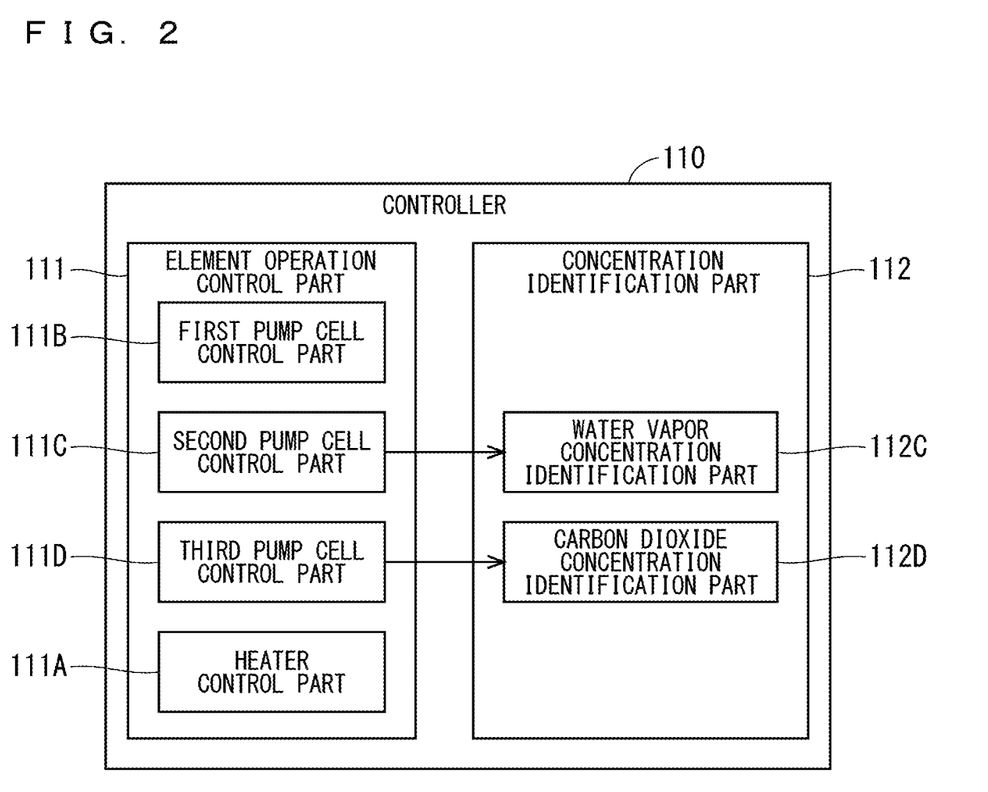
FIG. 2 is a block diagram showing functional components implemented by a controller 110.

FIG. 2 is a block diagram showing functional components implemented by the controller 110. The controller 110 is configured by one or more electronic circuits including one or more central processing units (CPUs), a storage device, and the like, for example. Each of the electronic circuits is a software functional part implementing a predetermined functional component by a CPU executing a predetermined program stored in the storage device, for example. The controller 110 may naturally be configured by an integrated circuit, such as a field-programmable gate array (FPGA), on which a plurality of electronic circuits are connected in accordance with their functions and the like.

In a case where the gas sensor 100 is attached to the exhaust path of the engine of the vehicle, and is used with the exhaust gas flowing along the exhaust path treated as the measurement gas, some or all of the functions of the controller 110 may be implemented by an electronic control unit (ECU) of the vehicle.

The controller 110 includes, as the functional components each implemented by the CPU executing the predetermined program, an element operation control part 111 controlling operation of each part of the sensor element 101 described above and a concentration identification part 112 performing processing of identifying the concentrations of the sensing target gas components contained in the measurement gas.

The element operation control part 111 mainly includes a heater control part 111A controlling operation of the heater 72, a first pump cell control part 111B controlling operation of the first pump cell 21, a second pump cell control part 111C controlling operation of the second pump cell 50, and a third pump cell control part 111D controlling operation of the third pump cell 41.

On the other hand, the concentration identification part 112 mainly includes a water vapor concentration identification part 112C and a carbon dioxide concentration identification part 112D respectively identifying a concentration of $H_2O$ and a concentration of $CO_2$ as the main sensing target gas components of the gas sensor 100.

<Multi-gas Sensing and Concentration Identification>

A method of sensing a plurality of types of gases (multi-gas sensing) and identifying concentrations of the sensed gases implemented by the gas sensor 100 having a configuration as described above will be described next. Assume hereinafter that the measurement gas is an exhaust gas containing oxygen, $H_2O$, and $CO_2$.

In the sensor element 101 of the gas sensor 100 according to the present embodiment, the measurement gas taken through the gas inlet 10 into the element is introduced through the buffer space 12 into the first chamber 20.

In the first chamber 20, oxygen is pumped out from the introduced measurement gas by operation of the first pump cell 21. A reduction (decomposition) reaction ($2H_2O \rightarrow 2H_2 + O_2$ and $2CO_2 \rightarrow 2CO + O_2$) of $H_2O$ and $CO_2$ contained in the measurement gas thus progresses, substantially all of $H_2O$ and $CO_2$ are decomposed into hydrogen ($H_2$), carbon monoxide (CO), and oxygen, and oxygen thus generated is pumped out. Decomposition of substantially all of $H_2O$ and $CO_2$ means that $H_2O$ and $CO_2$ are not introduced into the second chamber 40.

This is performed by the first pump cell control part 111B causing the first pump cell 21 to operate intermittently, setting a target value (control voltage) of the non-application electromotive force V1 in the first chamber sensor cell 80 in a range of 1000 mV to 1500 mV (preferably to 1000 mV) in accordance with desired oxygen partial pressure (oxygen concentration), and performing feedback control on the voltage Vp1 applied from the variable power supply 24 to the first pump cell 21 and an operating time of the first pump cell 21 in accordance with a difference between an actual value and the target value of the electromotive force V1 so that the target value is achieved. In this case, the voltage Vp1 is the sum of an IR overpotential and a reaction overpotential.

For example, a value of the non-application electromotive force V1 significantly deviates from the target value when the measurement gas containing a large amount of oxygen reaches the first chamber 20, and thus the first pump cell control part 111B controls the pump voltage Vp1 applied from the variable power supply 24 to the first pump cell 21 so that the deviation is reduced.

Figure 3:
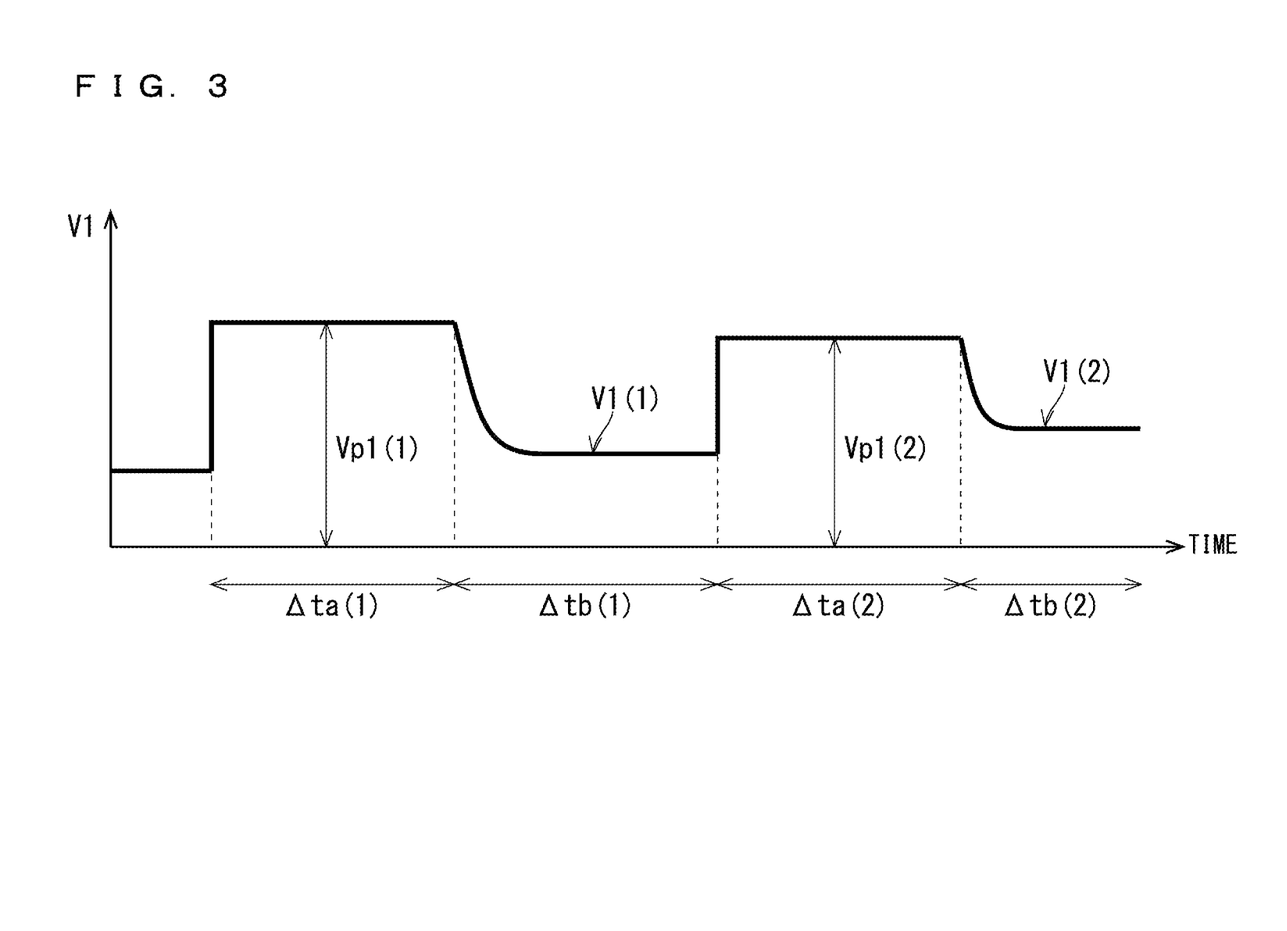
FIG. 3 shows an example of a change over time of electromotive force V1 in a first chamber sensor cell 80 during feedback control.

FIG. 3 shows an example of a change over time of the electromotive force V1 in the first chamber sensor cell 80 when the first pump cell control part 111B performs feedback control. Assume that voltages Vp1(1), Vp1(2), . . . are applied to the first pump cell 21 during times $\Delta ta(1)$, $\Delta ta(2)$, . . . , respectively, and voltages are not applied to the first pump cell 21 during times $\Delta tb(1)$, $\Delta tb(2)$, . . . as intervals between the times $\Delta ta(1)$, $\Delta ta(2)$, . . . in FIG. 3.

FIG. 3 shows that, in a case shown in FIG. 3, the voltages are intermittently applied to the first pump cell 21 during the times $\Delta ta(1)$, $\Delta ta(2)$, . . . to intermittently pump out oxygen from the first chamber 20, and the non-application electromotive force V1 gradually increases from V1(1) during the time $\Delta tb(1)$ to V1(2) during the time $\Delta tb(2)$, . . . Such intermittent application of the voltages to the first pump cell 21 is repeated based on the actual value of the non-application electromotive force V1 while the applied voltages and times of application are adjusted as appropriate, so that the non-application electromotive force V1 approaches the target value, and oxygen partial pressure in the first chamber sensor cell 80 is eventually maintained at a desired value.

While the measurement gas is continuously introduced through the gas inlet 10, operation of the first pump cell 21 is intermittent, so that the oxygen partial pressure (oxygen concentration) in the first chamber 20 might fluctuate due to gas diffusion while the first pump cell 21 is not operating. When the oxygen partial pressure (oxygen concentration) fluctuates, it is likely that the non-application electromotive force V1 fluctuates, to make reaching the target value difficult.

In the present embodiment, in view of the foregoing, interval times ($\Delta tb(1)$, $\Delta tb(2)$, . . . in FIG. 3) during which the first pump cell 21 does not operate are each set to 10 ms or less, and the sum of the interval times and the times of application of the voltage Vp1 to the first pump cell 21 is set to approximately 10 ms. Fluctuations of the oxygen partial pressure (oxygen concentration) due to gas diffusion thus become sufficiently small, and, further, fluctuations of the non-application electromotive force V1 are suppressed. An upper limit of the interval times of 10 ms is based on a time constant of gas diffusion of 100 ms experimentally confirmed in advance by obtaining a Cole-Cole plot for the electrodes.

As a result, the oxygen partial pressure in the first chamber 20 is sufficiently reduced by setting the target value (control voltage) of the non-application electromotive force V1 to a value in the range of 1000 mV to 1500 mV. The oxygen partial pressure is approximately 10-20 atm when an equation V1=1000 mV holds. The measurement gas in the first chamber 20 does not substantially contain $H_2O$, $CO_2$, and oxygen while containing $H_2$ and CO. The measurement gas is introduced into the second chamber 40.

In the second chamber 40, oxygen is pumped in by operation of the second pump cell 50, and only $H_2$ contained in the introduced measurement gas is oxidized.

Pumping-in of oxygen is performed by the second pump cell control part 111C causing the second pump cell 50 to operate intermittently, setting a target value (control voltage) of the non-application electromotive force V2 in the second chamber sensor cell 81 in a range of 250 mV to 450 mV (preferably to 350 mV) in accordance with desired oxygen partial pressure (oxygen concentration), and performing feedback control on the voltage Vp2 applied from the variable power supply 52 to the second pump cell 50 and an operating time of the second pump cell 50 in accordance with a difference between an actual value and the target value of the electromotive force V2 so that the target value is achieved. A specific manner of feedback control is similar to that in a case of the first pump cell 21 shown in FIG. 3 while they differ in pumping-in or -out. That is to say, the second pump cell 50 is caused to operate intermittently while the interval times are each set to 10 ms or less, and the sum of the operating time and the interval times is set to approximately 10 ms.

By operation of the second pump cell 50 in this manner, an oxidation (combustion) reaction $2H_2 + O_2 \rightarrow 2H_2O$ is facilitated, and $H_2O$ in an amount correlating with the amount of $H_2O$ introduced through the gas inlet 10 is generated again in the second chamber 40. In the present embodiment, $H_2O$ or $CO_2$ in an amount correlating with the amount of $H_2O$ or $CO_2$ means that the amount of $H_2O$ or $CO_2$ introduced through the gas inlet 10 and the amount of $H_2O$ or $CO_2$ generated again by oxidation of $H_2$ and CO generated by decomposition of $H_2O$ and $CO_2$ are the same, or are within a certain error range allowable in terms of measurement accuracy.

By setting the target value of the non-application electromotive force V2 to a value in the range of 250 mV to 450 mV, the oxygen partial pressure in the second chamber 40 is maintained at a value in a range in which almost all of $H_2$ is oxidized but CO is not oxidized. The oxygen partial pressure is approximately 10-7 atm when an equation V2=350 mV holds, for example.

The oxygen pump current Ip2 (hereinafter also referred to as a water vapor detection current Ip2) flowing through the second pump cell 50 when the non-application electromotive force V2 is maintained at the target value is substantially proportional to a concentration of $H_2O$ generated by combustion of $H_2$ in the second chamber 40 (there is a linear relationship between the water vapor detection current Ip2 and the concentration of $H_2O$ as generated). The amount of $H_2O$ generated by combustion correlates with the amount of $H_2O$ in the measurement gas decomposed once in the first chamber 20 after being introduced through the gas inlet 10. $H_2O$ in the measurement gas is thus sensed by the second pump cell control part 111C detecting the water vapor detection current Ip2.

Furthermore, there is a linear relationship between the water vapor detection current Ip2 and a water vapor concentration of the measurement gas. Data (water vapor characteristics data) showing the linear relationship is identified in advance using a model gas having a known water vapor concentration, and is held by the water vapor concentration identification part 112C. In the gas sensor 100 according to the present embodiment, the water vapor concentration identification part 112C acquires a value of the water vapor detection current Ip2 detected by the second pump cell control part 111C. The water vapor concentration identification part 112C identifies a value of the water vapor concentration corresponding to the acquired water vapor detection current Ip2 with reference to the water vapor characteristics data. The water vapor concentration of the measurement gas is thereby identified.

If no $H_2O$ is present in the measurement gas introduced through the gas inlet 10, decomposition of $H_2O$ in the first chamber 20 is naturally not caused, and thus $H_2$ is not introduced into the second chamber 40, so that the water vapor detection current Ip2 is almost zero.

As a result that $H_2$ is oxidized into $H_2O$, the measurement gas contains $H_2O$ and CO but substantially does not contain $CO_2$ and oxygen. The measurement gas is introduced into the third chamber 61. In the third chamber 61, oxygen is pumped in by operation of the third pump cell 41, and CO contained in the introduced measurement gas is oxidized.

Pumping-in of oxygen is performed by the third pump cell control part 111D causing the third pump cell 41 to operate intermittently, setting a target value (control voltage) of the non-application electromotive force V3 in the third chamber sensor cell 82 in a range of 100 mV to 300 mV (preferably 200 mV) in accordance with desired oxygen partial pressure (oxygen concentration), and performing feedback control on the voltage Vp3 applied from the variable power supply 46 to the third pump cell 41 and an operating time of the third pump cell 41 in accordance with a difference between an actual value and the target value of the electromotive force V3 so that the target value is achieved. A specific manner of feedback control is similar to that in a case of the first pump cell 21 shown in FIG. 3 while they differ in pumping-in or -out. That is to say, the third pump cell 41 is caused to operate intermittently while the interval times are each set to 10 ms or less, and the sum of the operating time and the interval times is set to approximately 10 ms.

By operation of the third pump cell 41 in this manner, an oxidation (combustion) reaction $2CO+O_2 \rightarrow 2CO_2$ is facilitated, and $CO_2$ in an amount correlating with the amount of $CO_2$ introduced through the gas inlet 10 is generated again in the third chamber 61.

By setting the target value of the non-application electromotive force V3 to a value in the range of 100 mV to 300 mV, the oxygen partial pressure in the third chamber 61 is maintained at a value in a range in which almost all of CO is oxidized. The oxygen partial pressure is approximately 10-4 atm when an equation V3=200 mV holds, for example.

The oxygen pump current Ip3 (hereinafter also referred to as a carbon dioxide detection current Ip3) flowing through the third pump cell 41 when the non-application electromotive force V3 is maintained at the target value is substantially proportional to a concentration of $CO_2$ generated by combustion of CO in the third chamber 61 (there is a linear relationship between the carbon dioxide detection current Ip3 and the concentration of $CO_2$ as generated). The amount of $CO_2$ generated by combustion correlates with the amount of $CO_2$ in the measurement gas decomposed once in the first chamber 20 after being introduced through the gas inlet 10. $CO_2$ in the measurement gas is thus sensed by the third pump cell control part 111D detecting the carbon dioxide detection current Ip3.

Furthermore, there is a linear relationship between the carbon dioxide detection current Ip3 and a carbon dioxide concentration of the measurement gas. Data (carbon dioxide characteristics data) showing the linear relationship is identified in advance using a model gas having a known carbon dioxide concentration, and is held by the carbon dioxide concentration identification part 112D. In the gas sensor 100 according to the present embodiment, the carbon dioxide concentration identification part 112D acquires a value of the carbon dioxide detection current Ip3 detected by the third pump cell control part 111D. The carbon dioxide concentration identification part 112D identifies a value of the carbon dioxide concentration corresponding to the acquired carbon dioxide detection current Ip3 with reference to the carbon dioxide characteristics data. The carbon dioxide concentration of the measurement gas is thereby identified.

If no $CO_2$ is present in the measurement gas introduced through the gas inlet 10, decomposition of $CO_2$ in the first chamber 20 is naturally not caused, and thus CO is not introduced into the third chamber 61, so that the carbon dioxide detection current Ip3 is almost zero.

As described above, the gas sensor 100 according to the present embodiment can suitably identify the water vapor concentration and the carbon dioxide concentration.

In addition, the gas sensor 100 can indirectly determine a concentration of oxygen contained in the measurement gas. Generally speaking, a difference value between a concentration (C1) of oxygen pumped out from the first chamber 20 and concentrations (C2 and C3) of oxygen pumped in to the second chamber 40 and the third chamber 61 shown below corresponds to the concentration of oxygen contained in the measurement gas introduced through the gas inlet 10.

$$C=C1-C2-C3 \quad (1)$$

C1, C2, and C3 are values substantially proportional to the oxygen pump current Ip1, the oxygen pump current Ip2, and the oxygen pump current Ip3, respectively, and thus the concentration of oxygen contained in the measurement gas can be determined from detected values of the oxygen pump currents Ip1, Ip2, and Ip3 by identifying relationships (constants of proportionality) between C1 and Ip1, C2 and Ip2, and C3 and Ip3 in advance.

As described above, according to the present embodiment, a multi-gas sensor capable of measuring concentrations of predetermined gas components (at least water vapor and carbon dioxide) in the measurement gas as with the conventional gas sensor while having a smaller number of and a smaller area of electrodes, having a simpler structure, and being manufactured at a lower cost than the conventional gas sensor is implemented.

While the invention has been shown and described in detail, the foregoing description is in all aspects illustrative and not restrictive. It is therefore understood that numerous modifications and variations can be devised without departing from the scope of the invention.

What is claimed is:

1. A gas sensor capable of measuring concentrations of a plurality of sensing target gas components in a measurement gas at least containing water vapor and carbon dioxide, the gas sensor comprising:
   a sensor element including a structure formed of an oxygen-ion conductive solid electrolyte; and
   a controller controlling operation of the gas sensor, wherein
   the sensor element includes:
      a gas inlet through which the measurement gas is introduced;
      a first chamber, a second chamber, and a third chamber communicating sequentially from the gas inlet via different diffusion control parts;
      a reference pump electrode being in contact with a reference gas;
      a first pump cell including a first inner electrode disposed to face the first chamber, the reference pump electrode, and a portion of the solid electrolyte present between the first inner electrode and the reference pump electrode;
      a second pump cell including a second inner electrode disposed to face the second chamber, the reference pump electrode, and a portion of the solid electrolyte present between the second inner electrode and the reference pump electrode; and
      a third pump cell including a third inner electrode disposed to face the third chamber, the reference pump electrode, and a portion of the solid electrolyte present between the third inner electrode and the reference pump electrode,
   the first pump cell pumps out oxygen from the first chamber so that substantially all of the water vapor and the carbon dioxide contained in the measurement gas introduced through the gas inlet into the first chamber are decomposed,
   the second pump cell pumps in oxygen to the second chamber to selectively oxidize, in the second chamber, hydrogen contained in the measurement gas, which has been generated by decomposition of the water vapor and is introduced from the first chamber into the second chamber,
   the third pump cell pumps in oxygen to the third chamber to oxidize, in the third chamber, carbon monoxide contained in the measurement gas, which has been generated by decomposition of the carbon dioxide and is introduced from the second chamber into the third chamber,
   the controller includes:
      a first pump cell control element controlling a first voltage applied across the first inner electrode and the reference pump electrode of the first pump cell and a first time of application therefor;
      a second pump cell control element controlling a second voltage applied across the second inner electrode and the reference pump electrode of the second pump cell and a second time of application therefor;
      a third pump cell control element controlling a third voltage applied across the third inner electrode and the reference pump electrode of the third pump cell and a third time of application therefor;
      a water vapor concentration identification element identifying a concentration of the water vapor contained in the measurement gas based on a magnitude of a current flowing between the second inner electrode and the reference pump electrode during the second time of application when the second pump cell pumps in oxygen to the second chamber; and
      a carbon dioxide concentration identification element identifying a concentration of the carbon dioxide contained in the measurement gas based on a magnitude of a current flowing between the third inner electrode and the reference pump electrode at during the third time of application when the third pump cell pumps in oxygen to the third chamber,
   the first pump cell control element controls the first pump cell to apply the first voltage intermittently at intervals of 10 ms or less as a duration of the first time of application so that a non-application electromotive force $V1$ is maintained at a predetermined target value in a range of 1000 mV to 1500 mV, the non-application electromotive force $V1$ being generated between the first inner electrode and the reference pump electrode when the first voltage is not applied across the first inner electrode and the reference pump electrode,
   the second pump cell control element controls the second pump cell to apply the second voltage operate intermittently at intervals of 10 ms or less as a duration of the second time so that non-application electromotive force $V2$ is maintained at a predetermined target value in a range of 250 mV to 450 mV, the non-application electromotive force $V2$ being generated between the second inner electrode and the reference pump electrode when the second voltage is not applied across the second inner electrode and the reference pump electrode, and
   the third pump cell control element controls the third pump cell to apply the third voltage intermittently at intervals of 10 ms or less as a duration of the third time of application so that non-application electromotive force $V3$ is maintained at a predetermined target value in a range of 100 mV to 300 mV, the non-application electromotive force $V3$ being generated between the third inner electrode and the reference pump electrode when the third voltage is not applied across the third inner electrode and the reference pump electrode.

2. The gas sensor according to claim 1, wherein
   the first inner electrode is disposed on only one of surfaces defining the first chamber in the structure,
   the second inner electrode is disposed on only one of surfaces defining the second chamber in the structure, and
   the third inner electrode is disposed on only one of surfaces defining the third chamber in the structure.

3. A concentration measurement method of measuring concentrations of a plurality of sensing target gas components in a measurement gas at least containing water vapor and carbon dioxide using a gas sensor, wherein
   the gas sensor includes a sensor element including an elongated planar structure formed of an oxygen-ion conductive solid electrolyte,
   the sensor element includes:
      a gas inlet through which the measurement gas is introduced;

a first chamber, a second chamber, and a third chamber communicating sequentially from the gas inlet via different diffusion control parts;

a reference pump electrode being in contact with a reference gas;

a first pump cell including a first inner electrode disposed to face the first chamber, the reference pump electrode, and a portion of the solid electrolyte present between the first inner electrode and the reference pump electrode;

a second pump cell including a second inner electrode disposed to face the second chamber, the reference pump electrode, and a portion of the solid electrolyte present between the second inner electrode and the reference pump electrode; and a third pump cell including a third inner electrode disposed to face the third chamber, the reference pump electrode, and a portion of the solid electrolyte present between the third inner electrode and the reference pump electrode, the method includes:

a) pumping out, using the first pump cell, oxygen from the first chamber so that substantially all of the water vapor and the carbon dioxide contained in the measurement gas introduced through the gas inlet into the first chamber are decomposed;

b) pumping in, using the second pump cell, oxygen to the second chamber to selectively oxidize, in the second chamber, hydrogen contained in the measurement gas, which has been generated by decomposition of the water vapor and is introduced from the first chamber into the second chamber;

c) pumping in, using the third pump cell, oxygen to the third chamber to oxidize, in the third chamber, carbon monoxide contained in the measurement gas, which has been generated by decomposition of the carbon dioxide and is introduced from the second chamber into the third chamber;

d) identifying a concentration of the water vapor contained in the measurement gas based on a magnitude of a current flowing between the second inner electrode and the reference pump electrode at the time when the second pump cell pumps in oxygen to the second chamber; and e) identifying a concentration of the carbon dioxide contained in the measurement gas based on a magnitude of a current flowing between the third inner electrode and the reference pump electrode at the time when the third pump cell pumps in oxygen to the third chamber, in the step a), the first pump cell operates intermittently to apply a first voltage across the first inner electrode and the reference pump electrode at intervals of 10 ms or less so that a non-application electromotive force V1 is maintained at a predetermined target value in a range of 1000 mV to 1500 mV, the non-application electromotive force V1 being generated between the first inner electrode and the reference pump electrode when the first voltage is not applied across the first inner electrode and the reference pump electrode, in the step b), the second pump cell is operates intermittently to apply a second voltage across the second inner electrode and the reference pump electrode at intervals of 10 ms or less so that a non-application electromotive force V2 is maintained at a predetermined target value in a range of 250 mV to 450 mV, the non-application electromotive force V2 being generated between the second inner electrode and the reference pump electrode when the second voltage is not applied across the second inner electrode and the reference pump electrode, and in the step c), the third pump cell operates intermittently to apply a third voltage across the third inner electrode and the reference pump electrode at intervals of 10 ms or less so that non-application electromotive force V3 is maintained at a predetermined target value in a range of 100 mV to 300 mV, the non-application electromotive force V3 being generated between the third inner electrode and the reference pump electrode when the third voltage is not applied across the third inner electrode and the reference pump electrode.

4. The concentration measurement method using the gas sensor according to claim 3, wherein the first inner electrode is disposed on only one of surfaces defining the first chamber in the structure, the second inner electrode is disposed on only one of surfaces defining the second chamber in the structure, and the third inner electrode is disposed on only one of surfaces defining the third chamber in the structure.

* * * * *